US007551074B2

(12) United States Patent
Polzer

(10) Patent No.: US 7,551,074 B2
(45) Date of Patent: Jun. 23, 2009

(54) METHOD AND ARRANGEMENT FOR MONITORING A TRANSMISSION MEDIUM

(75) Inventor: Kurt Polzer, Rottenburg (DE)

(73) Assignee: Siemens Aktiengesellschaft, Munich (DE)

( * ) Notice: Subject to any disclaimer, the term of this patent is extended or adjusted under 35 U.S.C. 154(b) by 345 days.

(21) Appl. No.: 11/492,434

(22) Filed: Jul. 25, 2006

(65) Prior Publication Data

US 2007/0024428 A1    Feb. 1, 2007

(30) Foreign Application Priority Data

Jul. 26, 2005   (EP)   ................................. 05016231

(51) Int. Cl.
*G08B 29/00*   (2006.01)
*H04Q 1/30*    (2006.01)
*G05B 11/01*   (2006.01)

(52) U.S. Cl. .................. 340/514; 340/538; 340/538.15; 340/310.11; 340/310.12; 340/310.16

(58) Field of Classification Search .................. 340/514
See application file for complete search history.

(56) References Cited

U.S. PATENT DOCUMENTS 4,106,007 A * 8/1978 Johnston et al. ............. 375/259
4,429,299 A * 1/1984 Kabat et al. ............. 340/310.16
4,719,616 A * 1/1988 Akano ........................ 370/527
4,742,475 A * 5/1988 Kaiser et al. ................. 700/278
5,650,777 A   7/1997 Westfield et al.

FOREIGN PATENT DOCUMENTS

DE   198 34 863 A1   2/2000

OTHER PUBLICATIONS

Siemens "HART—Highway Addressable Remote Transducer"; SIMATIC PCS7 catalog, Chapter 12, 2005 edition.
Sun Guang-jun, "HART Field Communication Protocol", 2001.

* cited by examiner

*Primary Examiner*—Donnie L Crosland

(57) ABSTRACT

Field devices are commonly used in unprotected environments, which means that these field devices and the conductor pairs connecting the field devices to the input modules/output modules of an automation installation are exposed to significant climatic and environmental factors. These factors have a detrimental effect on the transmission quality of the signals to be transferred between field devices and modules, which may result in erroneous measurements and dangerous operating states during control of a technical process. Measures to simplify monitoring of the transmission medium are proposed.

11 Claims, 2 Drawing Sheets

METHOD AND ARRANGEMENT FOR MONITORING A TRANSMISSION MEDIUM

CROSS REFERENCE TO RELATED APPLICATIONS

This application claims priority of European application No. 05016231.2 EP filed Jul. 26, 2005, which is incorporated by reference herein in its entirety.

FIELD OF INVENTION

The invention relates to a method for monitoring a transmission medium, via which a first device can be connected to a second device, and via which can be transferred a current signal and a digital communications signal superimposed on this current signal. In addition, the invention relates to an arrangement suitable for implementing such a method, and a device for such an arrangement.

SUMMARY OF INVENTION

A method of the type cited in the introduction is known, for example, from the Siemens SIMATIC PCS7 catalog, chapter 12, 2005 edition, where a "HART" communications procedure is described (HART=Highway Addressable Remote Transducer) which allows flexible parameterization of field devices via conventional 4 to 20 mA technology. A feature of this technology is that both the analog 4 to 20 mA current signal and the digital communications signal can be transferred on one conductor pair, with an "FSK" technique (Frequency Shift Keying) being used for superimposing the digital communications signal on the analog 4 to 20 mA signal and for the bit coding. An analog signal having a frequency of 2200 Hz is assigned to a logic "0", and an analog signal having a frequency of 1200 Hz is assigned to a logic "1".

Field devices are commonly used in unprotected environments, which means that these field devices and the conductor pairs connecting the field devices to the input modules/output modules of an automation installation are exposed to significant climatic and environmental factors. These factors have a detrimental effect on the transmission quality of the signals to be transferred between field devices and modules, which may result in erroneous measurements and dangerous operating states during control of a technical process.

In order to prevent this, it is necessary to check the quality of the transmission path e.g. by measuring manually at the input module/output module a current indicated by a sensor and comparing it with the indicated current.

An object of the present invention is to define a method of the type cited in the introduction, which is used to simplify monitoring of a transmission medium. In addition, an arrangement shall be created that is suitable for implementing such a method, and also a device for such an arrangement.

The object is achieved by the independent claims.

It is advantageous that the transmission medium is checked automatically. The comparison result can undergo further processing in a higher-level "Asset Management System" in order to provide the user with information on the degradation level of the transmission medium in a diagnostics and maintenance view, where this Asset Management System also suggests to the user appropriate maintenance actions.

The invention is based on the idea that the digital communications signal representing a measured value or setpoint value is largely independent of the quality of a transmission medium. If the measured value or setpoint value determined from the communications signal differs from the current signal representing a measured value or setpoint value, then this indicates a fault in the transmission medium.

Further advantageous embodiments of the invention follow from the subsequent dependent claims.

BRIEF DESCRIPTION OF THE DRAWINGS

The invention, its embodiments and advantages are explained in greater detail below with reference to the drawing which illustrates an exemplary embodiment of the invention.

DETAILED DESCRIPTION OF INVENTION

Figure 2:
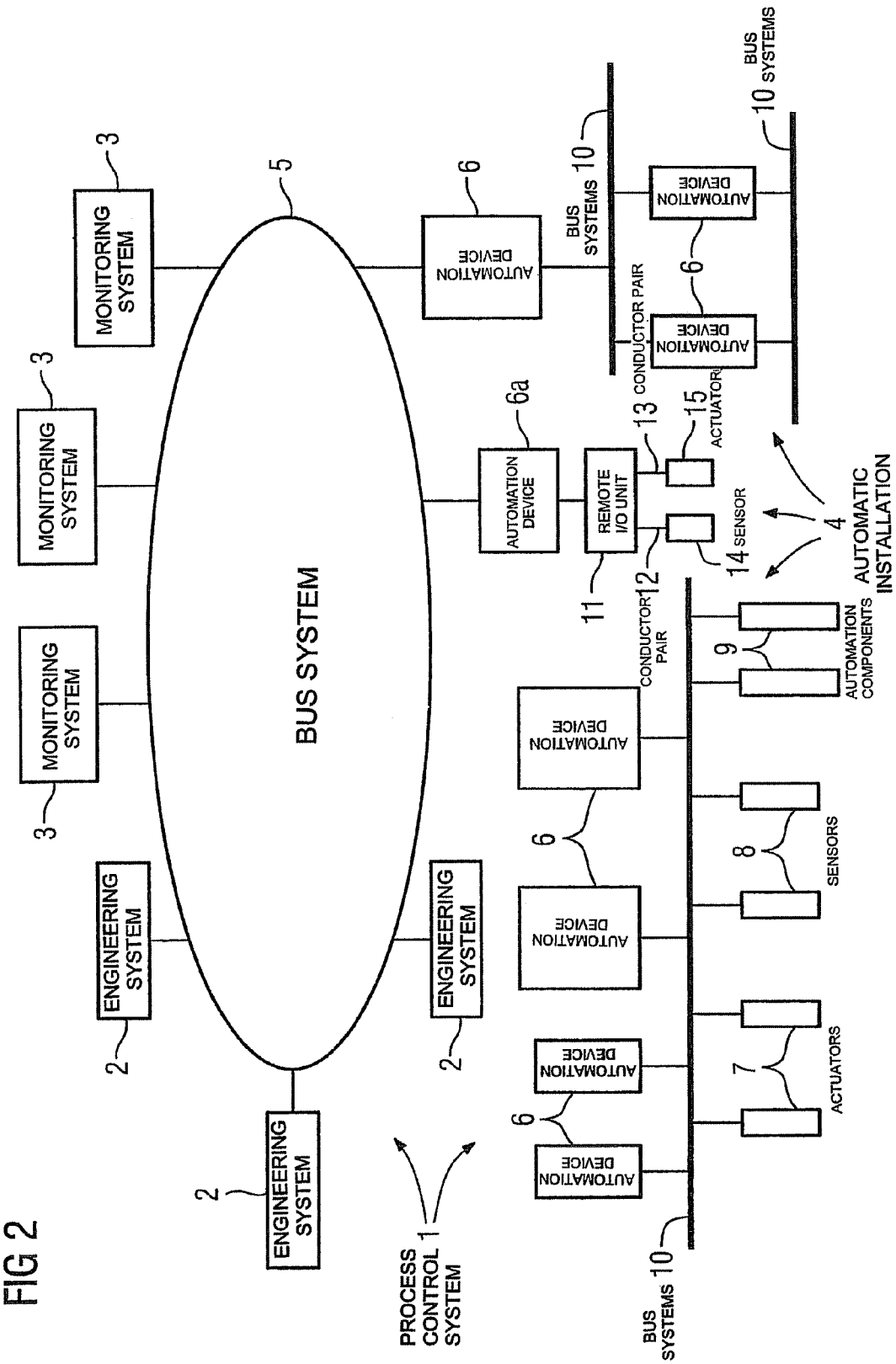
FIG. 2 shows a process control system.

Reference is made to FIG. 2 first, which shows a process control system 1 known per se. This process control system 1 has an engineering system 2, a control and monitoring system 3 and a programmed and configured automation installation 4, where the engineering system 2 is provided for programming and/or configuring the automation installation 4. The automation installation 4, which is connected via a bus system 5 and bus connections (not shown here) to the engineering system 2 and the control and monitoring system 3, comprises various automation devices 6, 6a, plus actuators 7 and sensors 8 and other automation components 9 required for controlling a technical installation. The automation devices 6, which are connected together via the bus system 5 and/or other suitable bus systems 10, can have different designs. Thus automation devices for performing small, medium-scale and larger automation tasks are usually provided within the automation installation 4, where micro programmable logic controllers can be used to perform small automation tasks, mini programmable logic controllers for performing medium-scale automation tasks and powerful programmable logic controllers for performing more complex automation tasks. The process control system is also provided with what is known as a remote I/O unit 11, which is connected to a master module of the automation device 6a, and is also connected to a sensor 14 and an actuator 15 via a respective I/O module and a conductor pair 12, 13 respectively, where the 4 to 20 mA technology based on the HART specification, known per se, is used.

Which hardware and software components the automation installation 4 is to be provided with, i.e. which automation devices, control and monitoring devices, bus systems, actuators and sensors, and which control programs it is to be provided with, depends on the complexity of the technical installation to be controlled and on the control task, where the required hardware and software components of the automation installation 4 can be programmed and/or configured by the engineering system 2.

Figure 1:
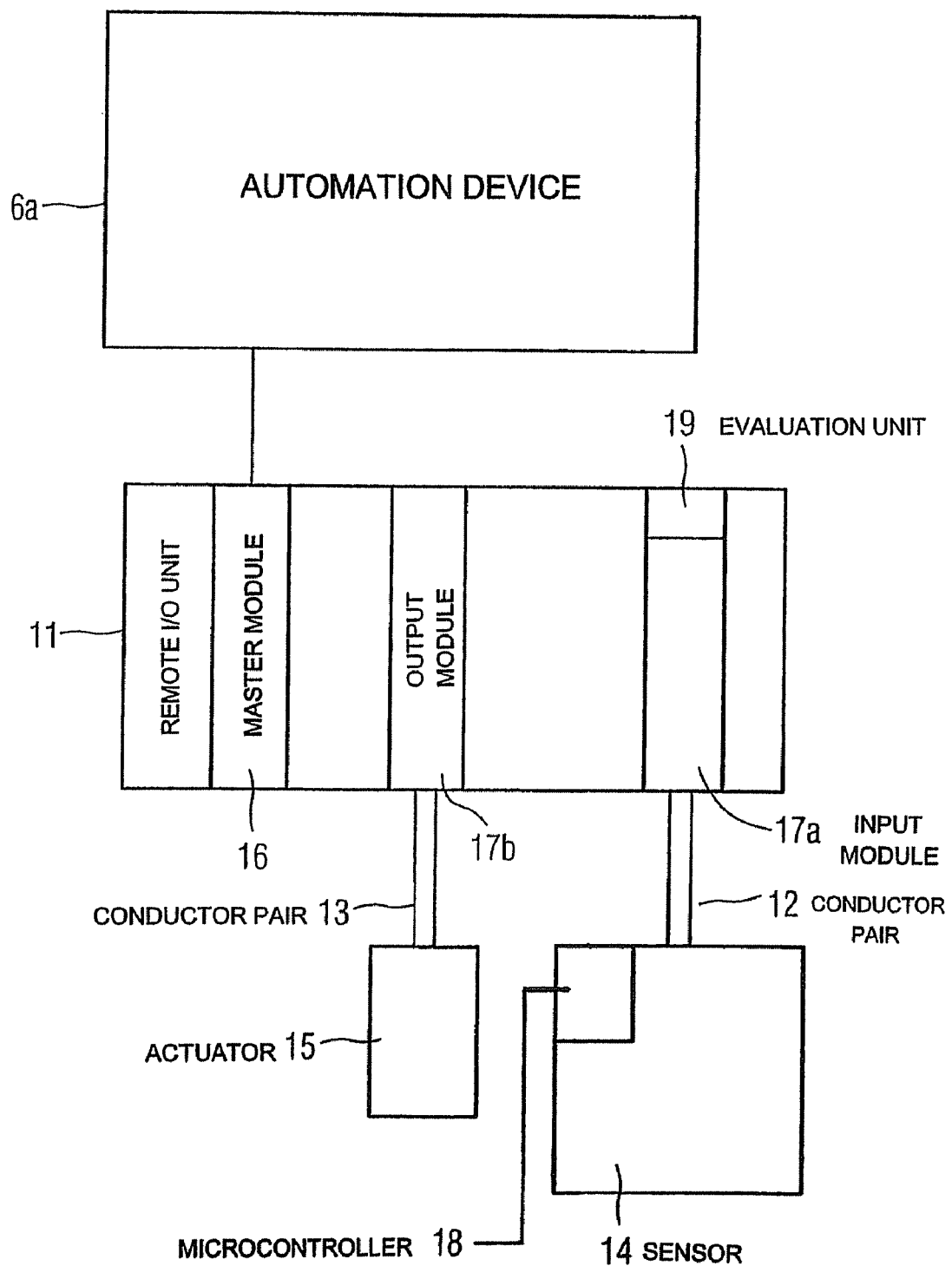
FIG. 1 shows a remote I/O unit.

Climatic and environmental factors may now have a detrimental effect on the transmission quality of the current to be transferred via the conductor pair 12 from the sensor 14 to the master module of the automation device 6a. Measures are therefore provided to monitor the quality of the conductor pair 12. These measures are described in greater detail below with reference to FIG. 1, which shows the remote I/O unit 11 of FIG. 2. The remote I/O unit 11 is provided with a master module 16, via which the remote I/O unit 11 is connected to the automation device 6a. In addition, the remote I/O unit 11 comprises an analog input module 17a and an analog output module 17b, with the sensor 14 being connected to the analog input module 17a via the conductor pair 12, and the actuator 15 being connected to the analog output module 17b via the conductor pair 13. The remote I/O unit 11 can obviously comprise other analog input modules and/or analog output modules for connecting additional sensors and/or actuators.

It is assumed below that the analog input module 17a supplies the sensor 14, e.g. a sensor in the form of a temperature transducer, with a constant voltage. As a result of this supply voltage and as a result of a measured temperature of a heating boiler, a current representing a measured value flows from the temperature transducer to the analog input module 17a, and a microcontroller 18 of the temperature transducer determines the measured value from said current. The temperature transducer also transfers to the analog input module 17a via the conductor pair 12 a digital communications signal representing this measured value and superimposed on the current, where periodically or at definable times an evaluation unit 19 of the analog input module 17a determines the measured values from this communications signal and from the current, and compares them. In the event that the comparison result reaches a definable value, the evaluation unit 19 produces a fault signal and transfers it e.g. to the control and monitoring system 3 (FIG. 1), which displays a suitable fault message and/or initiates appropriate maintenance actions in a diagnostics and/or maintenance view. Of course the evaluation unit 19 can be designed such that it not only reports a fault signal in the event of a fault, but reports the transmission quality in the form of a status signal whatever the situation. In addition, the evaluation unit 19 need not necessarily be part of the analog input module 17a, but can be part of an additional device of the automation installation that is connected to the analog input module 17a.

It is assumed below that the conductor pair 13, which connects the analog output module 17b to the actuator 15, is to be monitored. For this purpose, the analog output module 17b transfers to the actuator 15 both a current signal representing a setpoint value and a digital communications signal representing this setpoint value and superimposed on the current signal. The actuator determines the setpoint values from these signals, compares them and in the event that the comparison result reaches a definable value, the actuator 15 reports a fault.

The actuator can also be designed such that it merely transfers to the analog output module 17b a digital communications signal representing the comparison value, where the analog output module 17b or a device of the automation installation connected to this analog output module 17b reports a fault if the comparison result reaches a definable value.

The invention claimed is:

1. A method for monitoring a transmission medium, via which a first device can be connected to a second device, comprising:

transferring an analog current measurement signal representing a measured value over the transmission medium, the value transferred from the first device to the second device;

transferring a digital communications signal representing the measured value over the transmission medium, the value transferred from the first device to the second device; and comparing the values of the analog and the digital signals, wherein the digital communications signal is superimposed on the current measurement signal.

2. The method of claim 1, wherein the comparing the values is at the second device.

3. The method of claim 1, wherein the comparing the values is at a third device.

4. The method as claimed in claim 1, wherein a fault is reported depending on the comparison result.

5. An transmission medium monitoring system, comprising:

a first device;

a second device connected to the first device via the transmission medium; and an analog current measurement signal and a digital communications signal superimposed on the current measurement signal transferred via the transmission medium, wherein in order to monitor the transmission medium the first device transfers to the second device a value via the current measurement signal and the value via the digital communications signal, wherein the second device determines the values from the current measurement signal and the communications signal, and wherein the values of the analog and digital signals are compared.

6. The system as claimed in claim 5, wherein the comparison is at the second device or a third device.

7. The system as claimed in claim 6, wherein the comparison device reports a fault depending on the comparison result.

8. The system as claimed in claim 6, wherein the comparison result is transferred to a further device that reports a fault depending on the comparison result.

9. A first device for monitoring a transmission medium, the first device connected to second device via the transmission medium, the first device comprising:

an analog current measurement signal and a digital communications signal superimposed on the current measurement signal transferred to the first device via the transmission medium;

a value transferred via the current measurement signal and the value transferred via the digital communications signal; and a comparator that compares the values of the analog and digital signals.

10. A first device a claimed in claim 9, wherein the first device reports a fault depending on the comparison result, or transfers the comparison result to a device, which reports a fault or a message depending on the comparison result.

11. A first device a claimed in claim 9, wherein the first device transfers the comparison result to a third device for reporting a fault depending on the comparison result.

* * * * *